United States Patent
Johnson

(10) Patent No.: US 8,561,136 B2
(45) Date of Patent: Oct. 15, 2013

(54) SYSTEM TO AUDIT, MONITOR AND CONTROL ACCESS TO COMPUTERS

(76) Inventor: R. Brent Johnson, Zurich (CH)

(*) Notice: Subject to any disclaimer, the term of this patent is extended or adjusted under 35 U.S.C. 154(b) by 1005 days.

(21) Appl. No.: 12/117,247

(22) Filed: May 8, 2008

(65) Prior Publication Data

US 2009/0100507 A1 Apr. 16, 2009

Related U.S. Application Data

(60) Provisional application No. 60/978,969, filed on Oct. 10, 2007.

(51) Int. Cl.
*G06F 7/04* (2006.01)
*H04L 29/06* (2006.01)

(52) U.S. Cl.
CPC ........................... *H04L 63/08* (2013.01)
USPC ............................................................ 726/2

(58) Field of Classification Search
USPC ................................... 726/2, 3, 27–29
See application file for complete search history.

(56) References Cited

U.S. PATENT DOCUMENTS

| | | | |
|---|---|---|---|
| 5,032,979 A * | 7/1991 | Hecht et al. ................. | 726/25 |
| 5,592,657 A | 1/1997 | Johnson et al. | |
| 5,970,149 A | 10/1999 | Johnson | |
| 6,122,740 A * | 9/2000 | Andersen ..................... | 726/4 |
| 6,275,855 B1 | 8/2001 | Johnson | |
| 6,317,838 B1 | 11/2001 | Baize | |
| 6,499,108 B1 | 12/2002 | Johnson | |
| 6,578,146 B2 | 6/2003 | Johnson | |
| 7,080,260 B2 | 7/2006 | Johnson | |
| 7,123,974 B1 * | 10/2006 | Hamilton .................... | 700/87 |
| 7,293,179 B2 | 11/2007 | Johnson | |
| 7,941,827 B2 * | 5/2011 | John et al. ................... | 726/4 |
| 2002/0035498 A1 * | 3/2002 | Kehoe et al. ................ | 705/8 |
| 2006/0112276 A1 | 5/2006 | Coley et al. | |
| 2006/0206922 A1 | 9/2006 | Johnson et al. | |
| 2007/0261102 A1 * | 11/2007 | Spataro et al. .............. | 726/2 |
| 2008/0163335 A1 * | 7/2008 | Hagstrom ................... | 726/1 |
| 2008/0288215 A1 * | 11/2008 | Duberry ...................... | 702/186 |

FOREIGN PATENT DOCUMENTS

| | | |
|---|---|---|
| DE | 20022443 | 8/2001 |
| EP | 1162807 | 12/2001 |
| EP | 1255392 | 11/2002 |

* cited by examiner

*Primary Examiner* — Peter Shaw
(74) *Attorney, Agent, or Firm* — Head, Johnson & Kachigan, P.C.

(57) ABSTRACT

An audit, monitor, and access control system for use with at least one user computer and at least one protected computer. The system includes first software to authenticate authorized access by a user computer. A server connection network adapter permits communication with a user computer. Second software is provided to authenticate authorized superuser access by a user computer. A client connection network adapter permits communication with a protected computer. All data transferred and all activity between user computers and protected computers is recorded. Additionally, all data transferred and all activity between the user computers and the protected computers is audited.

11 Claims, 1 Drawing Sheet

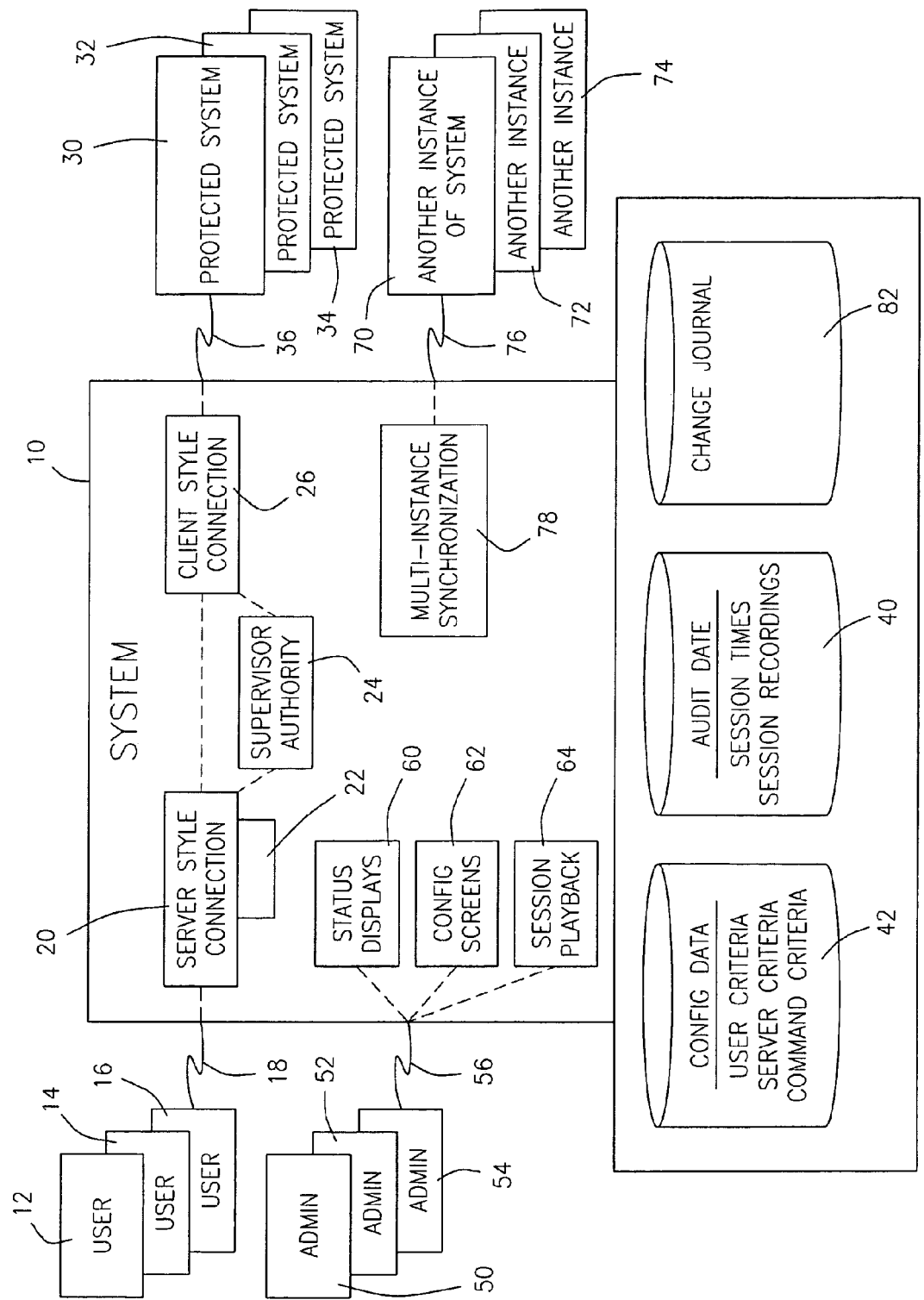

SYSTEM TO AUDIT, MONITOR AND CONTROL ACCESS TO COMPUTERS

CROSS-REFERENCE TO PENDING APPLICATIONS

This application is based on and is entitled to the filing date of U.S. Provisional Patent Application Ser. No. 60/978,969 filed Oct. 10, 2007.

BACKGROUND OF THE INVENTION

1. Field of the Invention

The present invention is directed to a system to audit, monitor and control access to computers. In particular, the present invention relates to a system juxtaposed between one or more user computers and one or more protected computers wherein the present invention includes auditing, monitoring and access control functions.

2. Prior Art

It is extremely important to protect various computers and computer networks from improper access and from external tampering or invasion. At the same time, it is important to allow authorized access to computers and networks or, alternatively, to certain aspects or functions of a computer, computers or networks. The present invention provides a system that is interposed or juxtaposed between one or more user computers and one or more protected computers in order to verify and authorize proper access to the computer or portions of the computer.

By way of example, multiple midrange systems for a business may require protection from access while permitting access to authorized users. Examples of authorized users include maintenance and repair personnel at various locations.

It is also important and desirable in many instances to provide alternate levels of access to computer systems. For example, one ordinary type of access will allow communication and data transfer with certain functions. Alternatively, a superuser or other type of user will have access to additional portions of the protected computer and its systems.

It is also desirable to provide a system that will audit and monitor all transactions and data between one or more users and one or more protected computer systems.

Additionally, it is desirable to permit an administrator or administrators to monitor, to audit, and even to control the transactions between the various computer users and the various protected computer systems.

BRIEF DESCRIPTION OF THE DRAWINGS

FIG. 1 is a simplified diagrammatic view of a preferred arrangement embodying a system in order to audit, monitor, and control access to computers as set forth in the present invention.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Referring to FIG. 1, a simplified diagrammatic view of one preferred embodiment of the present invention is illustrated. The system 10 of the present invention includes a central processing system and is illustrated by a box.

One or more user central processing units or computers 12, 14 and 16 are connected to or communicate with the system 10 through a connection or network 18 to a port in communication with a server connection network adapter 20. While three users are depicted, it will be appreciated that a greater or lesser number may be employed. Each user computer 12, 14, and 16 would have a remote access utility.

In order to initiate usage, the user computer 12, 14 and 16 establishes an SSH (secure shell) connection into the system 10. The server connection network adapter 20 includes or is in communication with first software 22 which will authenticate authorized user access for the user computer. In one configuration, the first software prompts the user computer 12, 14 or 16 for a user identification (ID) and a password. Once the user computer 12, 14 or 16 has entered a user ID and password, the first software 22 will verify the response.

The first software 22 may also present back to the user computer 12, 14 or 16 a list from among protected computers (to be described in detail herein) that are permissible to access.

The present invention 10 also includes second software 24 which will authenticate authorized superuser access by the user computer 12, 14 or 16. Superuser access mode will be at a different or higher level than the normal authorized user.

A client connection network adapter 26 is in communication with one or more protected computer systems 30, 32 or 34 via a communication path such as a network 36. While three protected systems are depicted, a greater or lesser number may be employed. The communication network 36 may take various forms including the world wide web.

An audit database 40 provides a mechanism to record all data transferred and all activity between the user computers 12, 14 and 16 and the protected computer systems 30, 32 or 34. Additionally, configuration data may be maintained in a configuration database 42.

A remote administrator computer system or administrators 50, 52 or 54 may be connected to the invention 10 through a communication path or network 56 in order to monitor status displays 60, configuration screen 62 and session playback 64. The administrator or administrators may be located at a location remote from the protected system and remote from the present invention.

As an alternate arrangement, the present invention 10 may be utilized with multiple instances of the present invention such as shown at box 70, 72 or 74 connected through a network 76 and will interface with the system 10 through multiple instance synchronization software 78.

The present invention 10 is designed to protect one or more computer systems 30, 32, 34. In one non-limiting example, at least two network adapters, one connected to a private LAN able to reach the protected computers 30, 32 and 34 and another network adapter able to accept user connections. In this scenario, it is intended that the user computers are not able to directly connect to one of the protected computers. A user computer 12, 14 or 16 intending to access one of these protected computers would employ its normal known remote access utility, such as telnet, SSH or a GUI application such as Remote Desktop™. Instead of connecting directly to the protected computer 30, 32 or 34, the user computer connects to the present invention 10 which exposes the corresponding server-side components for the user's remote access utilities.

Once connected to the present invention 10, the user computer 12, 14 or 16 becomes prompted as necessary for a user ID and password to authenticate their access. After verifying this information, the present invention 10 makes some decisions then establishes a connection to the protected computer 30, 32 or 34 corresponding to the user's remote access utility. The system 10 may utilize proprietary software known as SecureAgent®, described in detail in Applicant's U.S. Pat. No. 5,970,149 and U.S. Pat. No. 6,499,108. Once connected, the present invention records all of the information transferred between the user computer and the protected computer for auditing, tightly controls restricted superuser access to the protected computer, and allows the ability to limit the general use of a protected computer system.

The connection between the user computer 12, 14 and 16 and a protected computer 30, 32 and 34 may be controlled using a variety of means. First and foremost, the present invention can impose restrictions upon which protected computers the user computer is allowed to access (i.e. authorization). Aside from this, the present invention 10 can operate differently based upon how the user computer 12, 14 or 16 connects to it, such as upon which TCP/IP port the connection is received. For example, the present invention might be designated to allow incoming connections on the default SSH port and present the user with a list of all the protected computers they are allowed to access, providing them a selection menu. On the other hand, the present invention might be designated to forward all incoming connections on a particular port to a specific protected computer and bypass the selection menu. Either method requires the user computer 12, 14 or 16 to be assigned the ability to access the targeted protected computer.

The present invention records all information transferred between the user computer 12, 14, or 16 and the protected computer, allowing the ability to audit any and all actions performed by the user. An administrator computer system 50, 52 or 54 is able to connect to the system 10 and browse available audit files categorized by system, date and/or user stored in the audit database 40. The administrator 50, 52 or 54 may select an audit file and play it back like a tape recorder, rewinding and fast forwarding as desired. Further, an administrator may 'piggy-back' onto any live session and monitor a user computer's actions in real time without impact. For such connections, the administrator 50, 52 or 54 is able to perform a disconnect on the user computer 12, 14 or 16 if deemed necessary.

On most computers, there is the concept of a superuser, such as root for UNIX-based systems, which is extremely important to restrict and monitor. The present invention offers a central mechanism. Whenever root access is desired, a special password must be entered. The system 10 intercepts such access and disconnects the normal uninterrupted flow of data between the user computer and the protected system. For any user attempting root access to a protected system, two passwords are employed: one the user must use to be granted root access through the system and another which the system 10 uses to attain root access to the protected computer system 30, 32 and 34. When the user requests root access, the system second software 24 prompts the user computer for a password which, when provided, is compared to the password granting root access through the system 10. Upon a successful match, the actual password to attain root access is sent to the protected computer 30, 32 or 34. These passwords are not identical and the user computer never knows the actual root password for the protected computer. As such, all superuser access to the protected computer must go through the system 10 and be recorded. Even were a user able to physically avoid the system by directly connecting to the private network of the protected computer, they would be unable to attain root access to it since they do not know the actual root password.

In addition to monitoring for superuser access, the system 10 is able to restrict user input (e.g. commands) to a specified allowed set. This set is built upon filter groups containing criteria for the user computer 12, 14 or 16 and the protected computers 30, 32 or 34 meaning the allowed commands for one particular user to a protected system may differ from those allowed for another user to that same protected system. Further, the commands allowed for a user computer to a particular protected system may differ from those the user computer may issue to another protected system.

In some cases, however, it is not feasible to collect all of the computers to be protected onto a private network in which case everything is located on a public network: the system 10, the protected computers and the user computers. This, too, is supportable in either of two additional methods as follows:

The first method involves the system 10 not only protecting the superuser's password but also management of the user's password in an identical fashion where the password used by a user computer 12, 14 or 16 to connect into the system 10 does not match that used to connect into the protected computer 30, 32 or 34. Furthermore, when the user changes its password, they choose a new password used to access the system 10. At the same time, the system 10 changes the user's password on the protected system to a new random value which the system 10 stores.

The second method is an option not to manage the user's passwords in which case the same password used to connect into the present system 10 is used to connect into the selected protected computer 30, 32 or 34. In this case, only the actual superuser password remains secret. While the user computer 12, 14 or 16 remains able to directly connect to a protected computer 30, 32 or 34, they would be unable to attain superuser access without connecting through the system 10.

Because storing passwords is critical, that information is stored in an encrypted fashion and replicated to one or more additional systems. In fact, multiple instances of the system 10 of the present invention can coexist to satisfy not only the need of multiple password locations but also to have a backup through which to connect in the event one of our systems suffered a failure. Connections between the systems are also password protected themselves and the communications between them are encrypted.

Modifications made to one of the systems, such as password changes, are journalled to a change journal database 82 during the time another of the systems becomes unavailable and those updates are provided to it once it becomes reconnected.

Each computer system 30, 32 and 34 to be protected is entered into the system 10, the entry consisting of a network address (an example of a TCP/IP network address would consist of an IP address and a port number), a listen network address and a unique arbitrary designation or name. In addition to individual computer entries, there may be entered the names of one or more protected computers grouped together into protected computer groups. For TCP/IP, the listen information would indicate to which ports on the system 10 a user computer connection would potentially lead to that protected computer. If a unique port is entered, then no selection dialog would be issued upon a user connection. If the same port number is used for more than a single protected computer, then a selection dialog might be provided upon a user computer connection, depending on whether the user computer has been assigned the ability to connect to more than one protected computer using that port. If they are authorized for only one of them then no selection dialog is presented.

A command filter set may be entered consisting of one or more commands that either may or may not be entered (for example: "+date" would allow a user to issue the date command whereas "−date" would not). Additionally, wildcards may be used in a typical fashion (? for a single character in a position and * for global matching). A command set consisting of "+*" would indicate any command could be issued. Command sets may also be grouped together into command set groups.

Each user computer 12, 14 or 16 requiring access is entered into the system 10, the entry consisting of a user ID, password (s), computer names or protected computer groups and whether they could be granted superuser access and which command filter sets or command set groups are to be employed. The password used to access the system 10 would be stored along with the password or passwords for the protected computers 30, 32 or 34, if the option for them to be identical is not enabled. In this case, the protected computer groups are expanded and a list of all the unique protected computers available for this user would be shown so the administrator could potentially enter a different password for each of them. For each, there exists the option as to whether the user computer 12, 14 or 16 may attempt to enter superuser mode. If this option is not enabled, then any attempts to access superuser mode through the system of the present invention are rejected regardless of whether the user computer might know the correct superuser password. For each, there also exists the ability to assign command filter sets or command set groups. For each, there also exists the ability to control the time of day a user might establish and maintain a connection.

In addition to the aforementioned list of user criteria there also exists the ability to specify that a user computer have some degree of administrative access. Administrator access provides such things as viewing setup criteria, changing setup criteria, viewing playback recordings, deleting playback recordings, viewing live sessions, canceling live sessions, viewing user status panels and viewing server status panels.

When a user computer 12, 14 or 16 connects into the system 10 all data going in either direction, either from the user computer 12, 14 or 16 to the protected computer or from the protected computer to the user computer is recorded and stored into a session playback recording file. An administrator 50, 52 or 54 has the ability to connect to a specific port of the system and list all of the available such files, along with any currently being produced by a live session. The administrator may sort this information by such fields as date, protected computer, user name and whether superuser access was attained during that session. An administrator must connect using the same form of tool as employed by the user computer, for example: SSH. In this case, an administrator 50, 52 or 54 would use special keys to move back and forth through the recorded file much as when watching a recorded video such as a DVD. A subset of the keys would include the right and left arrows to move one character at a time, shift+right and shift+left to move 30 seconds worth of data at a time and other keys to move to the start, end or midpoints of the file. Search facilities also exist. Additional control keys are available to those administrators having required access such as the ability to delete the file being viewed.

In addition to searching while playing back a recorded session, an administrator 50, 52 or 54 may perform a search through many recorded sessions, such as all those for a particular user and/or a particular date and/or a particular system and be presented with the subset of recorded sessions, any of which may be selected for playback. The administrator may also narrow the search results by performing an additional search applied only against the current result subset.

Viewing a live session works exactly like viewing a playback recording aside from two additional controls: the ability to disconnect the user and the ability to remain at the current live point, meaning that the administrator actively views the same screen as the user.

Status or displays panels 60 also exist for the administrator 50, 52 or 54 whereby the administrator can quickly determine which user computers are connected to which protected computers, as well as a protected computer summary panel showing whether each is currently active and available.

When multiple instances of the system of the present invention are connected, they first synchronize their times so that any journalled changes may be properly reconciled. Multi-instance synchronization software is shown at box 78. The times of every change made to the system of the present invention, such as when a user changes their password, are stored along with the nature of the change event as shown in change journal database 82. If, for example, two systems are connected and it is determined that a user computer changed its password on one of them, then that password would be sent to the other system. Although unlikely, if the same user password were found to have become changed on both systems then the most recent change would be honored and the password updated appropriately. After this reconciliation logic has been performed an entry-for-entry comparison of the entire setup criteria of all instances of our system is compared and any problems corrected and logged.

Whereas, the present invention has been described in relation to the drawings attached hereto, it should be understood that other and further modifications, apart from those shown or suggested herein, may be made within the spirit and scope of this invention.

What is claimed is:

1. An audit, monitor, and access control system for use with at least one user computer and with at least one protected computer, which system comprises:
    at least one user computer;
    at least one protected computer; and
    a central processing unit comprising:
        first software installed and running on said central processing unit to authenticate authorized access by said at least one user computer;
        a server connection network adapter in communication with said at least one user computer;
        second software installed and running on said central processing unit to authenticate authorized superuser mode access by said at least one user computer;
        third software installed and running on said central processing unit to synchronize with another audit, monitor and access control system;
        a client connection network adapter in communication with said at least one protected computer; and
        a database which records and stores all data transferred and all activity between said at least one user computer and said at least one protected computer such that a session of data transfer and activity between said at least one user computer and said at least one protected computer is live monitored in real time and played back from a desired point, rewound to a second desired point, and fast-forwarded to a third desired point and where the session of data transfer and activity may be searched while being played back.

2. An audit, monitor, and access control system as set forth in claim 1 having at least one administrator computer in communication with said system to browse said data transferred between said at least one user computer and said at least one protected computer.

3. An audit, monitor, and access control system as set forth in claim 2 wherein said at least one administrator computer monitors said data transferred between said at least one user computer and said at least one protected computer in real time.

4. An audit, monitor, and access control system as set forth in claim 1 wherein said first software prompts said at least one user computer for a user ID and password and wherein said first software verifies the response.

5. An audit, monitor, and access control system as set forth in claim 4 wherein said passwords are stored in encrypted fashion.

6. An audit, monitor, and access control system as set forth in claim 4 wherein said second software utilizes a password or passwords for superuser access different from said first software password.

7. An audit, monitor, and access control system as set forth in claim 1 wherein said first software presents said at least one user computer with a list from among said protected computers permissible to access.

8. An audit, monitor, and access control system as set forth in claim 1 wherein said second software includes filters to restrict communication with said at least one protected system.

9. An audit, monitor, and access control system as set forth in claim 1 wherein a user ID and password are utilized between said client network adapter and said at least one protected computer.

10. An audit, monitor, and access control system as set forth in claim 9 wherein said user ID and password utilized between said client network adapter and said at least one protected computer are different from said user ID and password between said first software and said user computer.

11. An audit, monitor, and access control system for use with at least one user computer and with at least one protected computer, which system comprises:
   at least one user computer;
   at least one protected computer;
   a central processing unit comprising:
      first software installed and running on said central processing unit to
      authenticate authorized access by said at least one user computer wherein said first software presents said at least one computer with a list from among said protected computers permissible to access;
      a server connection network adapter in communication with said at least one user computer;
      second software installed and running on said central processing unit to authenticate authorized superuser mode access by said at least one user computer;
      third software installed and running on said central processing unit to synchronize with another audit, monitor and access control system;
      a client connection network adapter in communication with said at least one protected computer;
      a database capable of recording and storing all data transferred and all
   activity between said at least one user computer and said at least one protected computer such that a session of data transfer and activity between said at least one user computer and said at least one protected computer is live monitored in real time and is played back
   from a desired point, rewound from a second desired point, and fast-forwarded to a third desired point and where the session of data transfer and activity may be searched while being played back; and
   at least one administrator computer browsing and monitoring said data
   transferred between said at least one user computer and said at least one protected computer in real time.

* * * * *